US009465250B2

(12) United States Patent
Wu

(10) Patent No.: US 9,465,250 B2
(45) Date of Patent: Oct. 11, 2016

(54) SHUTTER GLASSES, DISPLAY DEVICE, DISPLAY SYSTEM AND DISPLAY METHOD

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 9 days.

(21) Appl. No.: 14/573,018

(22) Filed: Dec. 17, 2014

(65) Prior Publication Data

US 2015/0371054 A1 Dec. 24, 2015

(30) Foreign Application Priority Data

Jun. 18, 2014 (CN) .......................... 2014 1 0272806

(51) Int. Cl.
  G06F 21/00 (2013.01)
  G02F 1/1335 (2006.01)
  G02B 27/02 (2006.01)
  G06F 21/84 (2013.01)
  G06F 21/36 (2013.01)

(52) U.S. Cl.
  CPC ....... G02F 1/133528 (2013.01); G02B 27/022 (2013.01); G06F 21/84 (2013.01); G06F 21/36 (2013.01)

(58) Field of Classification Search
  CPC .................................................. G06F 21/6218
  See application file for complete search history.

(56) References Cited

U.S. PATENT DOCUMENTS

| | | | | |
|---|---|---|---|---|
| 2011/0157471 A1* | 6/2011 | Seshadri | ................... | G06F 3/14 348/564 |
| 2012/0081527 A1* | 4/2012 | Richardson | ........ | H04N 13/0497 348/56 |
| 2013/0050189 A1* | 2/2013 | Tseng | ................. | G02B 27/2264 345/419 |
| 2013/0103943 A1* | 4/2013 | Hirsch | ..................... | G09C 5/00 713/168 |
| 2014/0333831 A1* | 11/2014 | Oh | ....................... | H04N 5/2254 348/376 |

FOREIGN PATENT DOCUMENTS

| | | | | |
|---|---|---|---|---|
| CN | 1272188 | A | 11/2000 | |
| CN | 2526907 | Y * | 12/2002 | ......... G06F 21/6218 |
| CN | 2526907 | Y | 12/2002 | |
| CN | 202563212 | U | 11/2012 | |
| CN | 102970551 | A | 3/2013 | |
| JP | 2006127296 | A | 5/2006 | |

OTHER PUBLICATIONS

Chinese Patent Application No. 201410272806.6, Office Action dated Nov. 30, 2015, nine (9) pages, English translation, eleven (11) pages.
Second Office Action dated May 26, 2016 corresponding to Chinese application No. 201410272806.6.

* cited by examiner

*Primary Examiner* — Morshed Mehedi
(74) *Attorney, Agent, or Firm* — Nath, Goldberg & Meyer; Joshua B. Goldberg

(57) ABSTRACT

The present invention provides shutter glasses comprising lenses and a shutter configured to control on-state or off-state of the lenses, wherein, the shutter is capable of turning on the lenses of the shutter glasses according to a predetermined first timing. The present invention further provides a display device, a display system and a display method. The shutter glasses provided by the present invention and the display device provided by the present invention are operated cooperatively, only a wearer wearing the shutter glasses can view coherent target images, while a person who does not wear the shutter glasses cannot identify contents of the target images, and cannot obtain contents of target images even when the display screen of the display device is photographed. With the shutter glasses and the display device provided by the present invention, security can be improved when operating confidential files.

17 Claims, 3 Drawing Sheets

SHUTTER GLASSES, DISPLAY DEVICE, DISPLAY SYSTEM AND DISPLAY METHOD

FIELD OF THE INVENTION

The present invention relates to the field of display technology, and particularly to shutter glasses, a display device operated cooperatively with the shutter glasses, a display system comprising the shutter glasses and the display device, and a display method.

BACKGROUND OF THE INVENTION

Currently, sense of confidentiality on techniques and information has gained more attention than ever before. Common ways to maintain secrecy include, for example, encrypting files or a display device for operating the files.

However, with the development of computer skills, encrypted files or encrypted devices can often be cracked. Moreover, secret-stealers are likely to photograph a display screen of an operating device (e.g., a display device such as a computer or the like) to obtain contents of the encrypted files while an operator is operating encrypted files.

As a result, how to prevent leakage when operating confidential files has become an urgent technical problem to be solved in the field.

SUMMARY OF THE INVENTION

An object of the present invention is to provide shutter glasses, a display device operated cooperatively with the shutter glasses, a display system comprising the shutter glasses and the display device, and a display method. The display system comprising the shutter glasses and the display device is capable of performing safe operation on confidential files.

In order to achieve the above object, as an aspect of the present invention, shutter glasses comprising lenses and a shutter configured to control on-state or off-state of the lenses is provided, wherein, the shutter is capable of turning on the lenses of the shutter glasses according to a predetermined first timing.

Preferably, the shutter glasses comprise an identity recognition module configured to identify a wearer.

Preferably, the shutter glasses further comprise an alarm module, and when the identity recognition module determines that identity of the wearer is illegal, the shutter is controlled to turn off the lenses of the shutter glasses, and the alarm module is controlled to send out an alarm signal.

Preferably, the shutter glasses further comprise a first communication module, when determining that the identity of the wearer is legal, the identity recognition module sends a legal signal to the first communication module, the first communication module sends out a handshake signal based on the legal signal, the first communication module is capable of receiving a control signal with the predetermined first timing and sending the control signal to the shutter, the shutter then controls the lenses to be turned on based on the control signal; and when determining that the identity of the wearer is illegal, the identity recognition module sends an illegal signal to the first communication module, the first communication module turns off after receiving the illegal signal.

Preferably, the first communication module includes any one of an infrared communication module, a Bluetooth communication module and a wireless fidelity module.

Preferably, the identity recognition module identifies the wearer at predetermined intervals.

Preferably, the identity recognition module is capable of obtaining iris information of the wearer.

Preferably, a first polarizer is attached to each of the lenses of the shutter glasses.

As another aspect of the present invention, a display device is provided, wherein, the display device is operated cooperatively with the above shutter glasses provided by the present invention. The display device comprises a display panel, a target image signal sending module and an interference image signal sending module; the target image signal sending module provides signals of a plurality of frames of target images having coherent contents to the display panel according to the predetermined first timing, so that the display panel displays the plurality of frames of target images according to the predetermined first timing; the interference image signal sending module is capable of providing signals of a plurality of frames of interference images to the display panel according to a predetermined second timing, so that the display panel displays the plurality of frames of interference images according to the predetermined second timing; at least one frame of interference image is interposed between two adjacent frames of target images displayed by the display panel; and the interference image and the target image adjacent thereto are incoherent in content.

As still another aspect of the present invention, a display system is provided, and the display system comprises the above shutter glasses and display device provided by the present invention.

Preferably, the shutter glasses further comprise a first communication module, and when determining that the identity of the wearer is legal, the identity recognition module sends a legal signal to the first communication module, the first communication module sends out a handshake signal based on the legal signal;

the display device further comprises:

a second communication module capable of receiving the handshake signal; and a control signal generating module capable of generating a control signal with the predetermined first timing after the second communication module receives the handshake signal, and sending the control signal to the shutter of the shutter glasses via the second communication module, the control signal is capable of controlling motion of the shutter of the shutter glasses to turn on the lenses of the shutter glasses.

Preferably, the shutter glasses comprise a first polarizer attached to each of the lenses, the display panel comprises a liquid crystal cell and a second polarizer arranged at a light-incident side of the liquid crystal cell, and the first polarizer has a polarization direction perpendicular to that of the second polarizer.

As still another aspect of the present invention, a display method is provided, the display method is applied to the above display system, wherein, the display method comprises:

following step performed at the shutter glasses side:

S14, turning on the lenses of the shutter glasses according to the first timing; and following steps performed at the display device side:

S23, displaying a plurality of frames of target images having coherent contents according to the first timing;

S24, displaying interference images according to the second timing such that at least one frame of interference image is interposed between two adjacent frames of target images, and the interference image and the target image adjacent thereto are incoherent in content.

Preferably, steps performed at the shutter glasses side further comprise the following step performed before step S14:

S11, determining whether the identity of a wearer is legal or not;

when the identity of the wearer is legal, steps performed at the shutter glasses side further comprise:

S12, generating a handshake signal and sending the handshake signal to the display device;

S13, receiving a control signal with the predetermined first timing;

in step S14, the lenses of the shutter glasses are turned on according to the control signal;

steps performed at the display device side further comprise the following steps performed before step S23:

S21, receiving the handshake signal; and

S22, generating the control signal with the predetermined first timing based on the handshake signal.

Preferably, when the identity of the wearer is illegal, steps performed at the shutter glasses side further comprise:

S15, stopping receiving the control signal; and

S16, turning off the lenses of the shutter glasses and generating an alarm signal.

Preferably, among the steps performed at the shutter glasses side, step S11 is performed at predetermined intervals.

The shutter glasses provided by the present invention and the display device provided by the present invention are operated cooperatively, the display device displays target images according to the first timing, and the lenses of the shutter glasses are turned on according to the first timing. When the lenses of the shutter glasses are turned on, the wearer can view the target images displayed by the display device through the lenses of the shutter glasses. The display device displays interference images between two adjacent frames of target images, and at this point, the lenses of the shutter glasses are turned off. Consequently, only the wearer wearing the shutter glasses can view coherent target images, while a person who does not wear the shutter glasses can only view incoherent images, cannot identify the contents of the target images, and cannot grasp the contents of files even when the display screen of the display device is photographed. It can be seen that, with the shutter glasses and display device provided by the present invention, security can be improved when operating confidential files (i.e., target images), and leakage can be avoided when operating confidential files.

BRIEF DESCRIPTION OF THE DRAWINGS

The accompanying drawings, as a part of the specification, is used for providing a further understanding of the present invention, and explaining the present invention in conjunction with the following specific implementations, rather than limiting the present invention. In the accompanying drawings.

DETAILED DESCRIPTION OF THE EMBODIMENTS

Specific implementations of the present invention will be described in detail below in conjunction with the accompanying drawings. It should be understood that, the specific implementations described herein are merely used for illustrating and explaining the present invention, rather than limiting the present invention.

Figure 1:
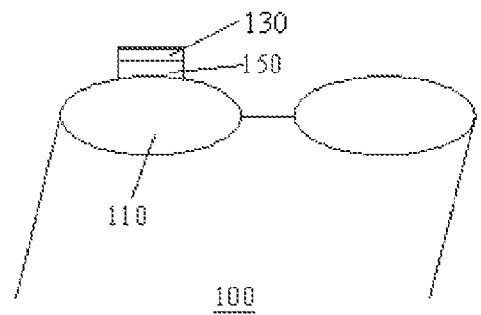
FIG. 1 is a schematic diagram of shutter glasses provided by the present invention.
Figure 2:
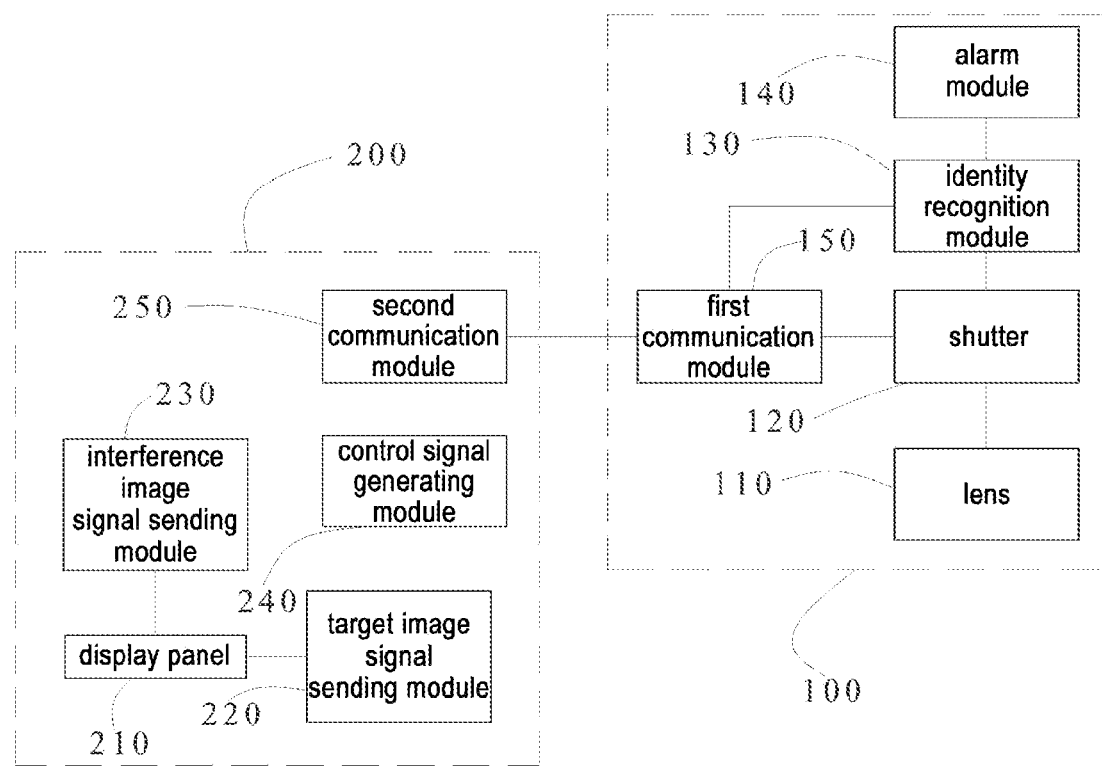
FIG. 2 is a schematic diagram illustrating modules of a display system provided by the present invention.

As shown in FIGS. 1 and 2, as an aspect of the present invention, shutter glasses 100 comprising lenses 110 and a shutter 120 (referring to FIG. 2) configured to control on-state or off-state of the lenses 110 is provided, wherein, the shutter 120 is capable of turning on the lenses 110 of the shutter glasses 100 according to a predetermined first timing.

It should be understood that, the shutter 120 may control on-state or off-state of the lenses 110 of the shutter glasses 100. When the lenses 110 of the shutter glasses 100 are turned on, light can pass through the lenses 110; when the lenses 110 are turned off, light cannot pass through the lenses 110.

The shutter glasses 100 provided by the present invention and the display device 200 provided by the present invention are operated cooperatively, the display device 200 displays target images according to the first timing, and the lenses 110 of the shutter glasses 100 are turned on according to the first timing (i.e., the lenses of the shutter glasses are only turned on in predetermined time periods, and turned off in other time periods, the sequence of the predetermined time periods is the first timing). In the case that the lenses 110 of the shutter glasses 100 are turned on, a wearer may view target images displayed by the display device 200 through the lenses 110 of the shutter glasses 100. The display device 200 displays interference image(s) between two adjacent frames of target images, and at this point, the lenses 110 of the shutter glasses 100 are turned off. Therefore, only the wearer wearing the shutter glasses 100 can view the coherent target images, while a person who does not wear the shutter glasses 100 can only view disorganized images and cannot identify the contents of the target images, and even when the display screen of the display device 200 is photographed, the person cannot grasp the contents of the target images either. It can be seen that, with the shutter glasses 100 and the display device 200 provided by the present invention, security can be improved when operating confidential files (i.e., target images), and leakage can be avoided when operating confidential files.

Specific structure of the shutter glasses 100 is not particularly limited in the present invention, as long as the shutter of the shutter glasses 100 can turn on the lenses of the shutter glasses 100 according to the predetermined first timing. For example, the lenses of the shutter glasses 100 may be small-sized liquid crystal panels, and the shutter of the shutter glasses 100 may control on-state and off-state of power supply of the shutter glasses 100. When the shutter controls the power supply of the shutter glasses 100 to be on, a voltage is applied to a liquid crystal layer in each of the lenses, and liquid crystals rotate so that the lenses allow light to pass through; when the shutter of the shutter glasses controls the power supply of the shutter glasses to be off, the voltage on the liquid crystal layer in each of the lenses is removed so that the lenses block from light.

In order to further improve security when operating the confidential files, preferable, the shutter glasses 100 may comprise an identity recognition module 130 for identifying the wearer.

Identity identifiers (e.g., fingerprint information, iris information and the like) of authorized persons may be previously recorded and stored in the identity recognition module 130, and collected identity identifier of the wearer is then compared with the identity identifiers stored in the identity recognition module 130. If there is an identity identifier consistent with the collected identity identifier in the identity recognition module, it indicates the identity of the wearer is legal; if there is no identity identifier consistent with the collected identity identifier in the identity recognition module, it indicates the identity of the wearer is illegal.

When the identity recognition module 130 determines that the identity of the wearer is legal (i.e., the wearer is the authorized person), the shutter 120 is allowed to turn on the lenses 110, that is, the wearer can view the displayed target images through the shutter glasses; when the identity recognition module 130 determines that the identity of the wearer is illegal (i.e., the wearer is not the authorized person), the shutter 120 is controlled to turn off the lenses 110, that is, the wearer cannot view the target images through the shutter glasses.

In the present invention, specific form of the identity recognition module 130 is not particularly limited, as long as the wearer can be identified. For example, the identity recognition module 130 may be set as a fingerprint identification module capable of identifying fingerprint of an operator. In this case, it necessary to identify the fingerprint of the wearer before the wearer puts on the shutter glasses 100, and to determine whether the identity of the wearer is legal or not. Alternatively, the identity recognition module 130 may be configured to obtain iris information of the wearer. In this case, as shown in FIG. 1, the identity recognition module 130 may be provided above the lenses, and when the wearer wears the shutter glasses 100, the identity recognition module 130 may obtain iris information of the wearer, and determines whether the identity of the wearer is legal or not based on the obtained iris information.

Preferably, the shutter glasses 100 further comprise an alarm module 140, and when the identity recognition module 130 determines that the identity of the wearer is illegal, the shutter 120 is controlled to turn off the lenses 110 of the shutter glasses 100, and the alarm module 130 is controlled to send out an alarm signal. Once determining that the identity of the wearer is illegal, the identity recognition module 130 controls the shutter 120 to turn off the lenses 110 of the shutter glasses 110 immediately, so as to reduce leakage of the target images. After the alarm module 140 sends out the alarm signal, a maintainer or a safety guard may be warned of illegal invaders and be warned that he may be needed to go to the site to deal with the issue promptly.

In the present invention, there is no particular limit to how to implement the process of turning on the lenses according to the first timing. For example, the shutter glasses may comprise a programmable controller in which a program is preset, so that once the shutter glasses are powered on, the programmable controller automatically runs the program and sends a control signal to the shutter to enable the shutter to control the lenses to be turned on according to the first timing.

As described above, the shutter glasses 100 are operated cooperatively with the display device 200, and in order to improve synchronicity between turning on the lenses of the shutter glasses 100 and displaying the target images by the display device 200, as well as to improve security when processing the confidential files, preferably, the shutter glasses 100 may further comprise a first communication module 150.

When determining that the identity of the wearer is legal, the identity recognition module 130 sends a legal signal to the first communication module 150, the first communication module 150 sends out a handshake signal based on the legal signal, and the display device 200 sends a control signal with the predetermined first timing to the first communication module 150 after receiving the handshake signal. The first communication module 150 can receive the control signal with the predetermined first timing and send the control signal to the shutter 120, and the shutter 120 then controls the lenses 110 to be turned on based on the control signal.

When determining that the identity of the wearer is illegal, the identity recognition module 130 sends an illegal signal to the first communication module 150, and the first communication module 150 turns off after receiving the illegal signal. The display device 200 will not generate the above control signal with the predetermined first timing in the case of not receiving the handshake signal.

In the present invention, specific structure of the first communication module 150 is not limited; for example, the first communication module 150 may include any one of an infrared communication module, a Bluetooth communication module and a wireless fidelity module (WIFI module). That is, the first communication module 150 may communicate with the display device 200 through any one of infrared communication, Bluetooth communication and WIFI communication.

To ensure security when processing the confidential files through the display device 200, preferably, the identity recognition module 130 identifies the wearer at predetermined intervals. For example, the wearer may be identified at intervals of one second. Whenever the wearer is identified illegal, the identity recognition module 130 sends the illegal signal to the first communication module 150.

To further improve security when processing the confidential files, preferably, a first polarizer may be attached to each of the lenses of the shutter glasses. In this case, the display device cooperating with the shutter glasses comprises a liquid crystal cell, and a second polarizer is arranged at a light-incident side of the liquid crystal cell, while no polarizer is arranged at a light-emergent side of the liquid crystal cell. The first polarizer on each of the lenses of the shutter glasses has a polarization direction perpendicular to that of the second polarizer arranged at the light-incident side of the liquid crystal cell. As a result, only white light can be seen to emit from the display device and contents displayed by the display device cannot be discerned without wearing the shutter glasses.

As another aspect of the present invention, as shown in FIG. 2, a display device 200 is provided, wherein, the display device 200 matches with the above shutter glasses 100 provided by the present invention. The display device 200 comprises a display panel 210, a target image signal sending module 220 and an interference image signal sending module 230; the target image signal sending module 220 is capable of providing signals of a plurality of frames of target images having coherent contents to the display panel 210 according to a predetermined first timing, so that the display panel 210 displays the plurality of frames of target images according to the predetermined first timing; the interference image signal sending module 230 is capable of providing signals of a plurality of frames of interference images to the display panel 210 according to a predetermined second timing, so that the display panel 210 displays the plurality of frames of interference images according to the predetermined second timing; at least one frame of interference image is interposed between two adjacent frames of target images displayed by the display panel 210; and the interference image and the target image adjacent thereto are incoherent in content.

Figure 3:
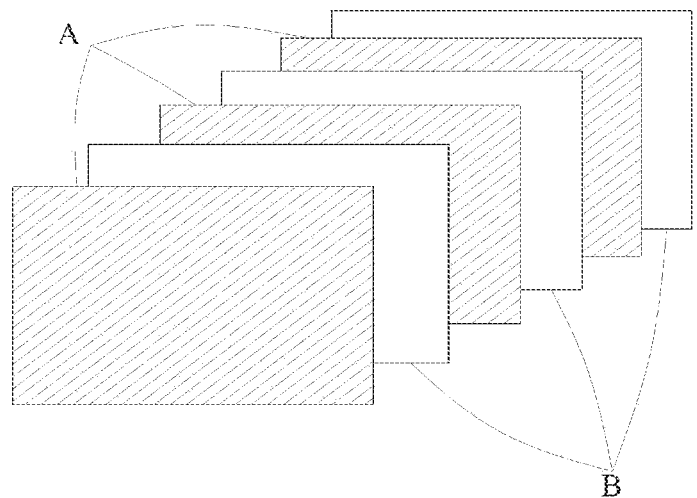
FIG. 3 is a schematic diagram illustrating a first example of a sequence of target images and interference images.
Figure 4:
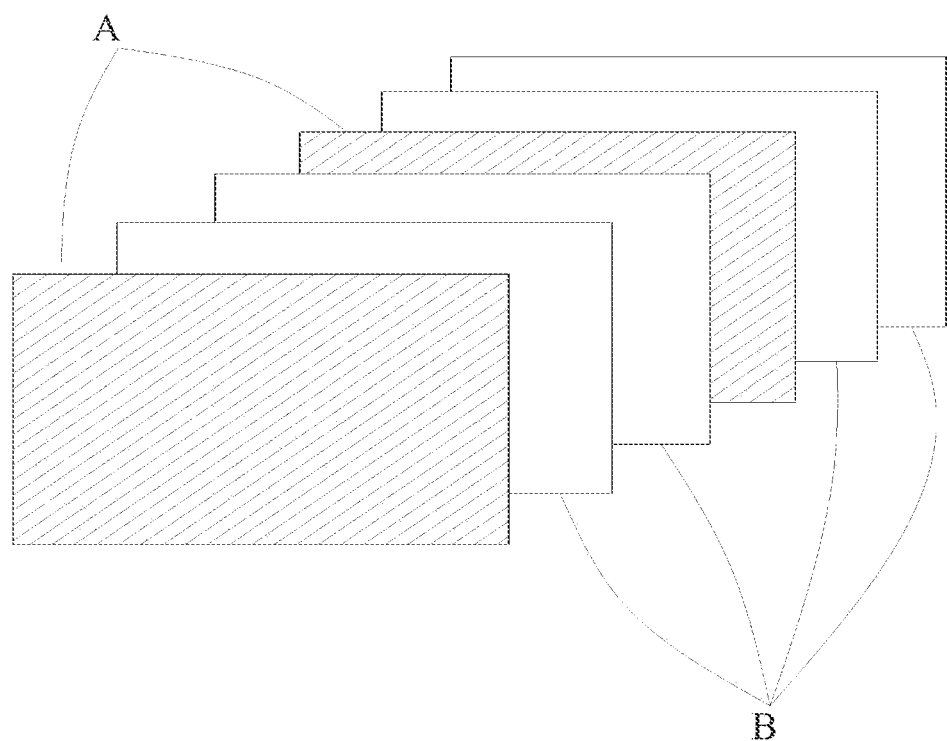
FIG. 4 is a schematic diagram illustrating a second example of a sequence of target images and interference images.

As shown in FIG. 3, one frame of interference image B is interposed between two adjacent frames of target images A; alternatively, as shown in FIG. 4, two frames of interference images B is interposed between two adjacent frames of target images A. Specific contents of the interference image B are not particularly limited in the present invention, as long as contents of the interference B and the target image A adjacent thereto are not coherent.

The display panel 210 of the display device 200 displays target images according to the first timing, and displays interference images according to the second timing, while the lenses 110 of the shutter glasses 100 are turned on according to the first timing, and are turned off at other times, so that the lenses 110 of the shutter glasses 100 are in an on-state when the display device 200 displays target images, while the lenses 110 of the shutter glasses 100 are in an off-state when the display device 200 displays interference images. Therefore, an operator wearing the shutter glasses 100 can view the coherent frames of target images through the lenses of the shutter glasses 100, thereby capable of viewing the target images clearly, while a person who does not wear the shutter glasses can only view disorganized images and thus cannot identify contents of the target images; even when the display screen of the display device is photographed, the person cannot obtain contents of the target images either. It can be seen that, with the shutter glasses 100 and the display device 200 provided by the present invention, security can be improved during operating process.

In the embodiment in which the shutter glasses 100 comprise the first communication module 150, the identity recognition module 130 of the shutter glasses 100 sends a legal signal to the first communication module 150 when determining that the identity of the wearer is legal, and the first communication module 150 sends out a handshake signal based on the legal signal.

In correspondence with the above embodiment in which the shutter glasses 100 comprise the first communication module 150, the display device 200 may further comprise a second communication module 250 and a control signal generating module 240. The second communication module 250 may receive the handshake signal. The control signal generating module 240 may generate the control signal with the predetermined first timing after the second communication module 250 receives the handshake signal, and send the control signal to the shutter 120 of the shutter glasses 100 via the second communication module 250. The control signal may control motion of the shutter 120 of the shutter glasses 100 to turn on the lenses 110 of the shutter glasses 100.

In the embodiment in which the shutter glasses 100 comprise the first polarizer attached to each of the lenses 110, the display panel 210 comprises a liquid crystal cell and a second polarizer arranged at a light-incident side of the liquid crystal cell (i.e., no polarizer is arranged at a light-emergent side of the liquid crystal cell), and the first polarizer has a polarization direction perpendicular to that of the second polarizer. As described above, without wearing the shutter glasses, the operator can only see white light emitted from the display device, but cannot discern contents displayed by the display device, thereby improving security when operating the confidential files with the display device and the shutter glasses provided by the present invention.

As still another aspect of the present invention, a display system is provided, and the display system comprises the above shutter glasses and display device provided by the present invention.

With the display system provided by the present invention, confidential files may be operated more safely and reliably.

Figure 5:
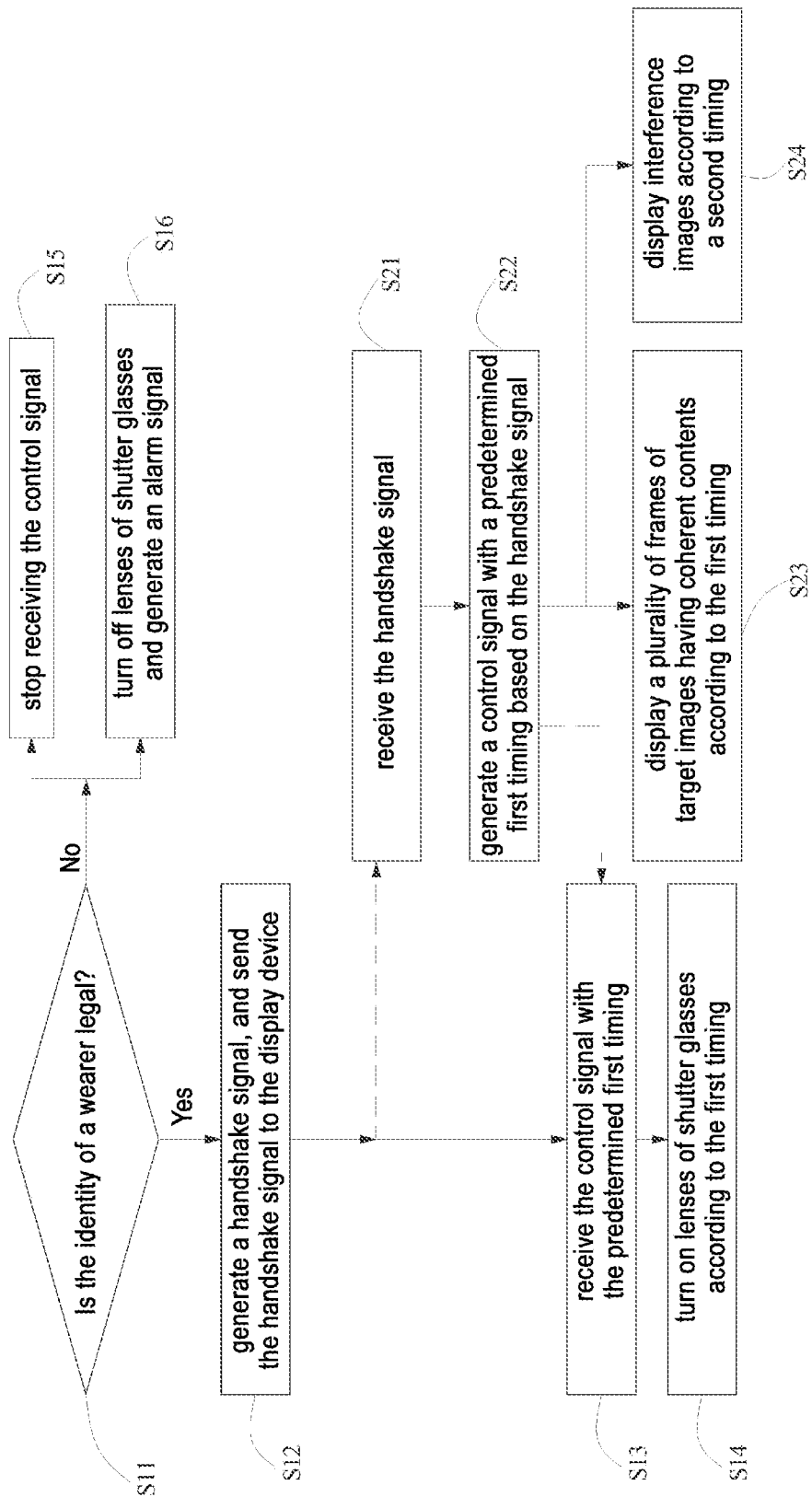
FIG. 5 is a flow chart of a display method provided by the present invention.

As still another aspect of the present invention, as shown in FIG. 5, a display method for performing display with the above display system is provided, the display method comprises:

following step performed at the shutter glasses side:
S14, turning on the lenses of the shutter glasses according to the first timing; and following steps performed at the display device side:
S23, displaying a plurality of frames of target images having coherent contents according to the first timing;
S24, displaying interference images according to the second timing such that at least one frame of interference image is interposed between two adjacent frames of target images, and the interference image and the target image adjacent thereto are incoherent in content.

As shown above, the lenses of the shutter glasses are turned on according to the first timing, the display device displays target images according to the first timing, and thus the timing of turning on the lenses of the shutter glasses is in synchronization with that of displaying the target images by the display device. When wearing the shutter glasses, the operator may view the plurality of frames of target images displayed continuously on the display device, but cannot see the interference images interposed among the plurality of frames of target images, thereby capable of viewing normally displayed target images so as to operate the confidential files represented by the target images. On the other hand, a person who does not wear the shutter glasses can only see disorganized images displayed on the display device, and cannot view or photograph actual contents of the target images.

It should be understood that, the shutter glasses are the above-described shutter glasses provided by the present invention, and the display device is the above-described display device provided by the present invention.

To further improve security of the display method, preferably, the display method further comprises:

the following step performed before step S14, at the shutter glasses side:
S11, determining whether the identity of a wearer is legal or not; and the following steps performed at the shutter glasses side when the identity of the wearer is legal:
S12, generating a handshake signal and sending the handshake signal to the display device;
S13, receiving a control signal with the predetermined first timing;
wherein, in step S14, the lenses of the shutter glasses are turned on according to the control signal;

steps performed at the display device side further comprise the following steps performed before step S23:
S21, receiving the handshake signal; and
S22, generating the control signal with the predetermined first timing based on the handshake signal.

It can be easily understood that, in the display method, specific sequence of performing the above steps may be as follows: S11, S12, S21, S22, S13.

Step S11 is performed by the identity recognition module of the shutter glasses, and in step S11, it is possible to determine whether the identity of the wearer is legal or not by identifying iris information, fingerprint information or the like of the wearer.

To further improve security of the display method, further preferably, when the identity of the wearer is illegal, steps performed at the shutter glasses side further comprise:

S15, stopping receiving the control signal; and

S16, turning off the lenses of the shutter glasses and generating an alarm signal.

In the present invention, step S15 and step 16 may be performed synchronously, or step S15 may be performed before step S16. After the alarm signal is generated by the shutter glasses, it is possible to inform a maintainer or a safety guard to rush to the site where the alarm signal occurs and bring the site under control.

Likewise, to further improve security of the display method, preferably, among the steps performed at the shutter glasses side, step S11 is performed at predetermined intervals. The predetermined interval may be one second.

As described above, iris of the wearer may be detected to determine whether the identity of the wearer is legal or not.

When confidential files are displayed by using the display method provided by the present invention, only the operator wearing the shutter glasses can see normally displayed target images, while others who do not wear the shutter glasses cannot see normally displayed target images. Consequently, with the display method provided by the present invention, security is improved when operating confidential files.

It can be understood that, above implementations are merely exemplary implementations used for explaining the principle of the present invention, but the present invention is not limited thereto. For those skilled in the art, various modifications and improvements may be made without departing from the spirit and essence of the present invention, and these modifications and improvements are deemed as falling within the protection range of the present invention.

The invention claimed is:

1. A display system, comprising shutter glasses and a display device operated cooperatively with the shutter glasses, the shutter glasses comprising lenses and a shutter configured to control on-state or off-state of the lenses, wherein the shutter is capable of turning on the lenses of the shutter glasses according to a predetermined first timing, and the shutter glasses comprise an identity recognition module configured to identify a wearer;

the display device comprising a display panel, a target image signal sending module and an interference image signal sending module, wherein the target image signal sending module provides signals of a plurality of frames of target images having coherent contents to the display panel according to the predetermined first timing, so that the display panel displays the plurality of frames of target images according to the predetermined first timing; the interference image signal sending module is capable of providing signals of a plurality of frames of interference images to the display panel according to a predetermined second timing, so that the display panel displays the plurality of frames of interference images according to the predetermined second timing; at least one frame of interference image is interposed between two adjacent frames of target images displayed by the display panel; and the interference image and the target image adjacent thereto are incoherent in content.

2. The display system according to claim 1, wherein the shutter glasses further comprise an alarm module, and when the identity recognition module determines that identity of the wearer is illegal, the shutter is controlled to turn off the lenses of the shutter glasses, and the alarm module is controlled to send out an alarm signal.

3. The display system according to claim 1, wherein the shutter glasses further comprise a first communication module, when determining that identity of the wearer is legal, the identity recognition module sends a legal signal to the first communication module, the first communication module sends out a handshake signal based on the legal signal, the first communication module is capable of receiving a control signal with the predetermined first timing and sending the control signal to the shutter, the shutter controls the lenses to be turned on based on the control signal; and when determining that the identity of the wearer is illegal, the identity recognition module sends an illegal signal to the first communication module, the first communication module turns off after receiving the illegal signal.

4. The display system according to claim 3, wherein the first communication module includes any one of an infrared communication module, a Bluetooth communication module and a wireless fidelity module.

5. The display system according to claim 1, wherein the identity recognition module identifies the wearer at predetermined intervals.

6. The display system according to claim 1, wherein the identity recognition module is capable of obtaining iris information of the wearer.

7. The display system of according to claim 1, wherein a first polarizer is attached to each of the lenses of the shutter glasses.

8. The display system according to claim 1, wherein the shutter glasses further comprise a first communication module, and when determining that identity of the wearer is legal, the identity recognition module sends a legal signal to the first communication module, the first communication module sends out a handshake signal based on the legal signal;

the display device further comprises:

a second communication module capable of receiving the handshake signal; and a control signal generating module capable of generating a control signal with the predetermined first timing after the second communication module receives the handshake signal, and sending the control signal to the shutter of the shutter glasses via the second communication module, the control signal is capable of controlling motion of the shutter of the shutter glasses to turn on the lenses of the shutter glasses.

9. The display system according to claim 8, wherein the shutter glasses further comprise an alarm module, and when the identity recognition module determines that the identity of the wearer is illegal, the shutter is controlled to turn off the lenses of the shutter glasses, and the alarm module is controlled to send out an alarm signal.

10. The display system according to claim 1, wherein the shutter glasses comprise a first polarizer attached to each of the lenses, the display panel comprises a liquid crystal cell and a second polarizer arranged at a light-incident side of the liquid crystal cell, and the first polarizer has a polarization direction perpendicular to that of the second polarizer.

11. The display system according to claim 8, wherein the shutter glasses comprise a first polarizer attached to each of the lenses, the display panel comprises a liquid crystal cell and a second polarizer arranged at a light-incident side of the liquid crystal cell, and the first polarizer has a polarization direction perpendicular to that of the second polarizer.

12. The display system according to claim 11, wherein the first communication module includes any one of an infrared communication module, a Bluetooth communication module and a wireless fidelity module.

13. A display method applied to the display system according to claim 1, the display method comprising:
following step performed at the shutter glasses side:
S14, turning on the lenses of the shutter glasses according to the first timing; and
following steps performed at the display device side:
S23, displaying a plurality of frames of target images having coherent contents according to the first timing; and
S24, displaying interference images according to the second timing such that at least one frame of interference image is interposed between two adjacent frames of target images, and the interference image and the target image adjacent thereto are incoherent in content.

14. The display method according to claim 13, wherein, steps performed at the shutter glasses side further comprise the following step performed before step S14:

S11, determining whether identity of a wearer is legal or not;
when the identity of the wearer is legal, steps performed at the shutter glasses side further comprise:
S12, generating a handshake signal and sending the handshake signal to the display device; and
S13, receiving a control signal with the predetermined first timing;
in step S14, the lenses of the shutter glasses are turned on according to the control signal;
steps performed at the display device side further comprise the following steps performed before step S23:
S21, receiving the handshake signal; and
S22, generating the control signal with the predetermined first timing based on the handshake signal.

15. The display method according to claim 13, wherein when the identity of the wearer is illegal, steps performed at the shutter glasses side further comprise:
S15, stopping receiving the control signal; and
S16, turning off the lenses of the shutter glasses and generating an alarm signal.

16. The display method according to claim 13, wherein, among the steps performed at the shutter glasses side, step S11 is performed at predetermined intervals.

17. The display method according to claim 14, wherein, among the steps performed at the shutter glasses side, step S11 is performed at predetermined intervals.

* * * * *